Dec. 30, 1947.  E. E. SMITH  2,433,791
UNIVERSAL JOINT
Filed Nov. 5, 1945
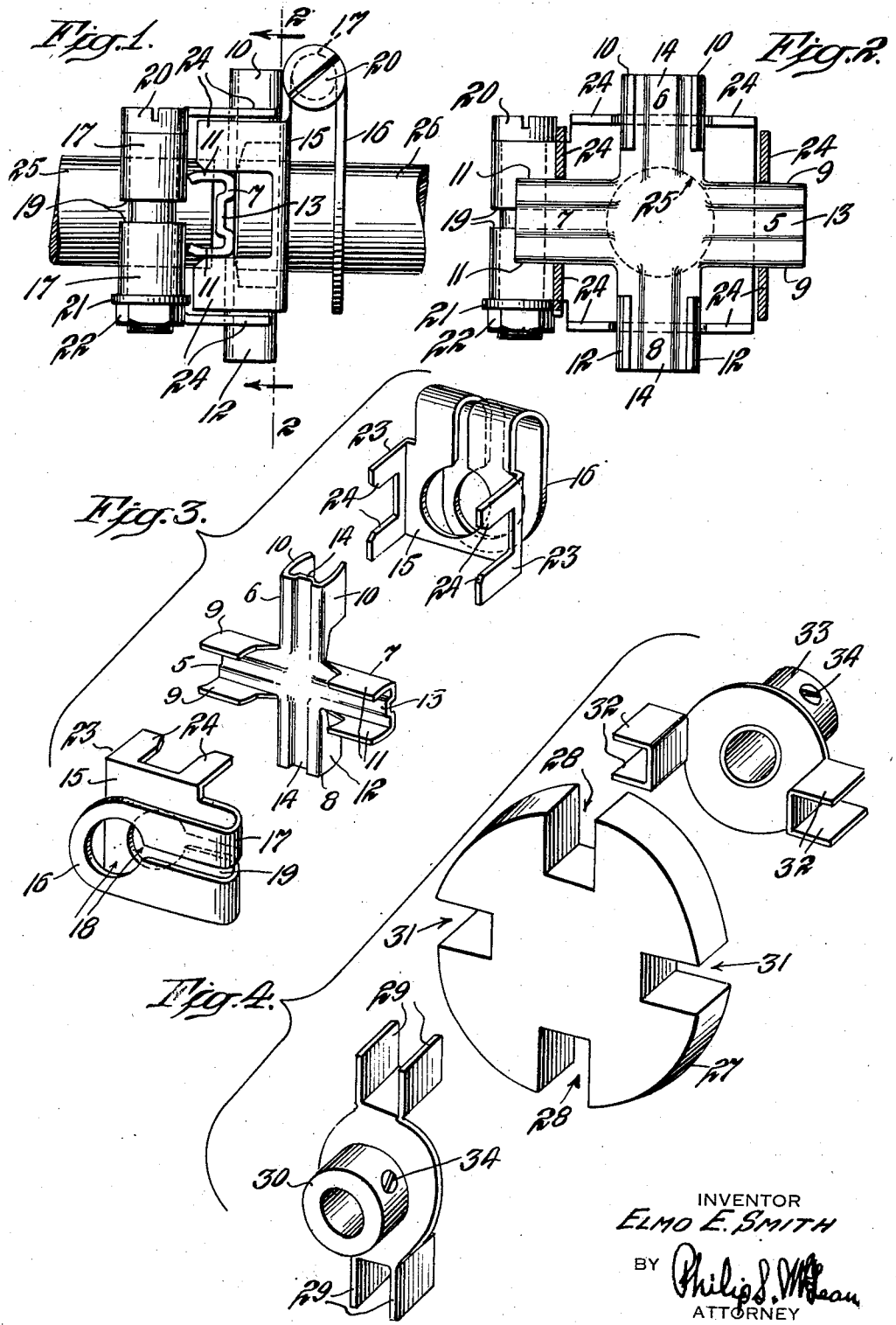
INVENTOR
ELMO E. SMITH
BY Philip S. McLean
ATTORNEY Patented Dec. 30, 1947

2,433,791

UNITED STATES PATENT OFFICE 2,433,791

UNIVERSAL JOINT

Elmo E. Smith, Villa Park, Ill., assignor to Croname, Incorporated, Chicago, Ill., a corporation of Illinois Application November 5, 1945, Serial No. 626,653

2 Claims. (Cl. 64—31)

The invention herein disclosed relates to universal joints.

Special objects of the invention are to provide a flexible form of shaft coupling which will automatically compensate for lateral as well as angular misalignment and which will maintain constant and exact transmission of rotation from one shaft to the other.

Further special objects are to provide a universal shaft coupling having the above outlined advantages which will be of particularly light, simple and inexpensive construction and adapted to such uses as providing the necessarily accurate connections between radio controls and tuning condensers and the like.

Other objects are to provide a universal joint construction in such form that it can be made up mainly or wholly of sheet metal parts.

Other desirable objects and the novel features by which the purposes of the invention are attained are set forth or will appear in the course of the following specification.

The drawing accompanying and forming part of the specification illustrates certain present preferred embodiments of the invention. Structure, however, may be modified and changed as regards the immediate disclosure, all within the true intent and broad scope of the invention as hereinafter defined and claimed.

Fig. 1 in the drawing is a side elevation of one form of the invention applied to and connecting two pieces of shafting, the latter broken and appearing in section;

Fig. 2 is a transverse sectional view as on substantially the plane of line 2—2 of Fig. 1;

Fig. 3 is a perspective view of the three main parts of the coupling, in separated relation;

Fig. 4 is a similar view showing parts of a modified form of the coupling.

In both forms of the invention illustrated the coupling is provided by an intermediate member interposed between the two shaft ends and having universal spring tensioned engagement with driving and driven members applied to the two shaft ends.

In the form of the invention shown in Figs. 1 to 3, the intermediate member is a cruciform stamping of sheet metal or possibly other sheet material, such as a springy plastic, having rectangularly related radial arms 5, 6, 7, 8, terminating in transversely extending pairs of bowed spring flanges 9, 10, 11 and 12, the diametrically opposed flanges 9 and 11 being directed to one side and the other diametrically opposed flanges 10 and 12 being directed to the opposite side of a common transverse plane.

The diametrically opposed radial arms 5 and 7 and 6 and 8 are in the nature of straight bars crossing at the center of the piece and these two bars, for stiffening purposes, are ribbed in opposite directions and in the direction of extent of the spring flanges, as indicated at 13 and 14, respectively.

Duplicate shaft clamping members are provided comprising each a single piece of sheet material folded intermediate its ends to form spaced parallel arms 15, 16, connected by a bight or bend 17, these arms having registering openings 18 to loosely receive the shaft and the bent or looped portion being slotted inwardly from the bend into these openings, as indicated at 19, to divide the arms into split clamping jaw portions which can be gripped together upon the shaft by a screw fastening disposed within the bend. This fastening is illustrated as a screw bolt 20 located within the loop or bend, having a head engaging over the edges of the clamp jaw portions at one side and a washer 21 engaging over the edges at the opposite side and held by the nut 22.

The construction described provides a split spring jaw clamp which can be gripped in secure engagement over the shaft by simply tightening the screw fastening located and supported in the loop of the one-piece clamp construction. On loosening this screw the clamp can be adjusted longitudinally or angularly on the shaft and be quickly secured in any desired adjusted relation.

Each of the spring clamps is shown as having flanges 23 bent back from the opposite side edges of the jaw portion 15 and these side flanges slotted or bifurcated to provide jaw members 24 spaced to receive between them the spaced spring flanges of the intermediate coupling member.

As particularly shown in Figs. 1 and 3, the spring jaw clamps are mounted on the ends of the adjoining shafts 25, 26, with the spaced lugs or jaws of the two clamps projecting toward each other and with the jaws of one clamp disposed at right angles to the jaws of the other clamp so as to accommodate the intermediate coupling member.

The bowed formation of the spring flanges 9, 10, 11, 12, causes the intermediate coupling member to have a yielding spring tensioned rolling engagement in the jaws of the shaft clamping members and thus to provide an invariable or constant drive connection irrespective of angular or lateral misalignment of the shafts. The radial sliding engagement between these parts allows for lateral displacement as well as for angular misalignment of the shafts.

The shaft clamping, driving and driven elements of the coupling may be made of spring sheet metal or other sheet material, such as plastics or the like, and in the latter event the material might have insulating qualities desirable to insulate one shaft from the other.

In the second form of the invention illustrated, the two pairs of angularly related spring coupling flanges are separated, one pair from the other, and carried by the shaft engaging members, and the intermediate coupling member is simply in the form of a flat disc notched in its edges to accommodate the two pairs of spring flanges.

The intermediate coupling disc is illustrated at 27, Fig. 4, having diametrically opposed notches 28 to accommodate the pairs of oppositely disposed spring flanges 29 carried by the shaft engaging bushing 30 and diametrically opposed notches 31 at right angles to the first notches to accommodate the spaced spring flanges 32 of the other shaft bushing 33.

Set screws 34 provide the means for adjustably securing the drive bushings on the shafts.

The operation of the second form of the invention is substantially the same as that first described, the spaced spring flanges having rocking and sliding engagement in the notched intermediate element to compensate for both lateral and angular misalignment of the shafts.

The intermediate coupling disc 27 may be made of Bakelite or other insulating material, thus to afford insulation between the coupled shafts.

Both forms of the invention are of simple, inexpensive construction, easily applied and providing accurate drive connections between lengths of shafting regardless of variations in alignment.

What is claimed is:

1. A universal shaft coupling comprising shaft engaging clamps consisting each of sheet material folded on itself to provide spaced jaw portions, said jaw portions having registering shaft passages and being split inwardly to said shaft openings, screw means engaged between the doubled material for clamping the split portions together, said shaft clamping members further having spaced jaws and an intermediate member having spaced spring flanges yieldingly entered in said jaws.

2. A universal shaft coupling comprising shaft engaging members consisting each of sheet material folded to provide substantially parallel side portions connected by a bend, said side portions having registering shaft openings and split inwardly from the bend to said shaft openings, a screw element seated in said bend for exerting a clamping force upon said split portions, said shaft engaging members having diametrically opposite drive elements projecting toward each other and an intermediate coupling element disposed between and having universal engagement with said drive elements.

ELMO E. SMITH.

REFERENCES CITED

The following references are of record in the file of this patent:

UNITED STATES PATENTS

| Number | Name | Date |
| --- | --- | --- |
| 958,540 | Remy | May 17, 1910 |
| 1,146,727 | Madden | July 13, 1915 |
| 1,262,406 | Taylor et al. | Apr. 9, 1918 |
| 1,702,407 | Lyman | Feb. 19, 1929 |
| 2,100,232 | Barry | Nov. 23, 1937 |
| 2,246,750 | Murphy | June 24, 1941 |